United States Patent
Deichmann et al.

(10) Patent No.: US 7,747,282 B1
(45) Date of Patent: Jun. 29, 2010

(54) MOBILE PHONE WITH EXPANDED TELEPHONE DIRECTORY

(75) Inventors: Volker Deichmann, Wuppertal (DE); Joerg-Michael Hasemann, Emtinghausen (DE); Marc Pietriga, Marxzell/Pfaffenrot (DE); Holger Schulz, Berlin (DE); Georg Soffel, Auenwald (DE)

(73) Assignee: Siemens Aktiengesellschaft, Munich (DE)

( * ) Notice: Subject to any disclaimer, the term of this patent is extended or adjusted under 35 U.S.C. 154(b) by 663 days.

(21) Appl. No.: 10/019,329

(22) PCT Filed: Jun. 21, 2000

(86) PCT No.: PCT/DE00/02020

§ 371 (c)(1),
(2), (4) Date: May 9, 2002

(87) PCT Pub. No.: WO00/79773

PCT Pub. Date: Dec. 28, 2000

(30) Foreign Application Priority Data

Jun. 23, 1999 (DE) ................... 199 28 666

(51) Int. Cl.
H04M 1/00 (2006.01)
H04B 1/38 (2006.01)
(52) U.S. Cl. .............. 455/558; 455/557; 455/556.1; 455/551; 455/550.1; 455/418; 455/420; 711/1; 711/2
(58) Field of Classification Search .......... 455/556.1–2, 455/557, 558, 550.1, 551, 418–420, 556.2; 379/354, 355; 711/1–4
See application file for complete search history.

(56) References Cited

U.S. PATENT DOCUMENTS

| | | | | |
|---|---|---|---|---|
| 5,768,362 A | * | 6/1998 | Moon | 379/355.05 |
| 6,009,338 A | * | 12/1999 | Iwata et al. | 455/575.4 |
| 6,370,374 B1 | * | 4/2002 | Eichinger et al. | 455/411 |
| 6,501,962 B1 | * | 12/2002 | Green | 455/558 |

FOREIGN PATENT DOCUMENTS

| | | |
|---|---|---|
| DE | 693 17 830 | 11/1998 |
| DE | 198 50 306 | 5/2000 |
| EP | 0 730 387 | 9/1996 |
| EP | 0 860 970 | 8/1998 |

(Continued)

OTHER PUBLICATIONS

Definition of database: n. A file composed of records, each containing fields together with a set of operations for searching, sorting, recombining and other functions., Microsoft Computer Dictionary, 4th edition, p. 123, 1999.

(Continued)

*Primary Examiner*—Tuan A Tran
(74) *Attorney, Agent, or Firm*—King & Spalding L.L.P.

(57) ABSTRACT

A mobile phone with an expanded telephone directory, wherein any electronic telephone directory of the mobile phone is supplemented by, in each case, one data base located in the nonvolatile memory of the mobile phone, each data base being assigned to precisely one specific telephone directory. The data base assigned to a telephone directory is preferably an expansion telephone directory, and a number of the expansion telephone directories can be assigned to each telephone directory.

7 Claims, 2 Drawing Sheets

FOREIGN PATENT DOCUMENTS

| EP | 0 899 927 | | 3/1999 |
|---|---|---|---|
| EP | 0 915 604 | | 5/1999 |
| EP | 0 982 913 | | 3/2000 |
| WO | WO 90/06648 | | 6/1990 |
| WO | WO 98/30053 | * | 7/1998 |

OTHER PUBLICATIONS

Definition of entry: n. 1: the right or privilege of entering : entrée, 2 : the act of entering: entrance, 3 : the place of entrance: as a: vestibule, passage b : door, gate, 4a : the act of making or entering a record b: something entered: as (1): a record or notation of an occurrence, transaction, or proceeding (2) : a descriptive record (as in a card catalog or an index) (3) : headword (4) : a headword with its definition or identification (5) :vocabulary entry, 5 : a person, thing, or group entered into something (as a contest or market), Miriam-Webster OnLine, www.merriam-webster.com/dictionary/entry, 2 pages, Feb. 16, 2009.

* cited by examiner

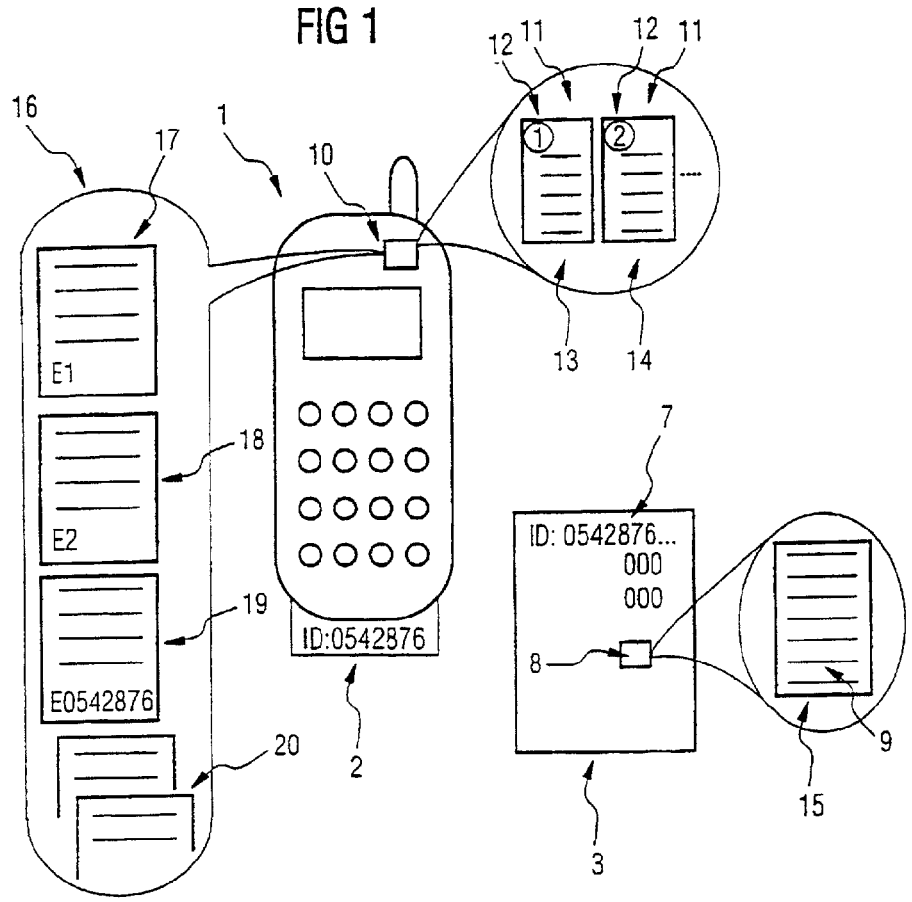
FIG 1
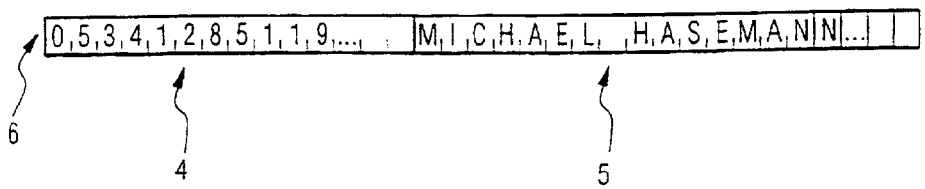

MOBILE PHONE WITH EXPANDED TELEPHONE DIRECTORY

BACKGROUND OF THE INVENTION

The present invention relates to a mobile phone, in particular a mobile phone according to the GSM (GSM=Groupe Speciale Mobile) standard, having at least one electronic telephone directory, one of which is stored on the SIM card and, if applicable, the other electronic telephone directory or directories is/are arranged in the nonvolatile memory of the telephone.

Mobile phones of the prior art according to the GSM standard generally have at least one electronic telephone directory, and it has now become the practice almost always to use two or more telephone directories. One of these telephone directories is stored on the SIM (SIM=Subscriber Identity Module) card, referred to below as SIM, and thus can be transported from one mobile phone to another. In contrast, the other telephone directory or directories is/are in the nonvolatile, internal memory which can be formed, for example, by EEPROMs or flash or battery-buffered RAM modules.

The internal data format of the SIM for storing telephone directory entries requires that a telephone directory entry be composed of a sequence of numbers (telephone number) and an associated sequence of alphanumeric characters (name). The maximum length of the telephone number is at least 20 numbers, and the maximum length of the name can be between 0 and 241 characters.

The same format is usually used for telephone directory entries which are located in the nonvolatile memory, it being possible for the maximum lengths to differ from those on the SIM card. In other words, the number of attributes or features of a telephone directory entry, an attribute being a telephone number or a name in this case, has been prescribed by the GSM standard and SIM card and is two.

Because, to date, the number of attributes for telephone entries of an SIM card has been prescribed, flexible use of the telephone directory of a mobile phone (for example, the grouping of telephone numbers according to certain properties such as work or personal), has not been possible.

The document EP-A-0 860 970 discloses a method for administering an electronic telephone directory or a telephone number database in the form in which it exists, for example, on an SIM card of a mobile phone. The telephone number database is divided into two memory areas; namely, into a first memory area in which telephone numbers which can be addressed via an abbreviated dialing method are arranged, and into a second memory area in which telephone numbers which cannot be addressed via an abbreviated dialing method are arranged. If a telephone number in the second memory area without the abbreviated dialing property is then to be shifted to a storage location in the first memory area with the abbreviated dialing property, the telephone number to be shifted is first shifted into a buffer, the number at the destination of the first memory area is shifted to the exit location of the memory area of the number to be shifted and then the number to be shifted is removed from the buffer and transmitted to the destination in the first buffer.

The document WO 98/30053 shows a mobile radio unit which has a telephone directory which is stored on an SIM card and a telephone directory which is stored in an EEPROM of the mobile radio unit. In order to select telephone directory entries easily, the two telephone directories are combined in an assignment table and abbreviated dialing numbers are assigned to specific telephone directory entries.

The document EP-A-0 915 604 discloses a method for searching through a database for a specific entry; in particular, for searching for an entry in a telephone directory which is stored in a mobile phone. The improved searching for a telephone directory entry is carried out in that, starting with the entry of a specific letter, all the variations of entries which have the entered letter and a different second letter are displayed. If the second letter of the entry is then also determined, all the variations of the first two entered letters appear with a third variable letter which also can be specified in a subsequent step. By repeated inputting of the respective following letters, a specific database entry or telephone directory entry is thus found.

The present invention is, therefore, directed toward acquiring expanded applications via telephone directory entries, in particular of forming groups of telephone directory entries and, in this way, dividing up the telephone numbers according to personal, business or other criteria, for example. The intention of the present invention is to overcome the format of the number of attributes which has been previously prescribed by the GSM standard and is of restricted length.

SUMMARY OF THE INVENTION

According to the present invention, any electronic telephone directory of a mobile phone is supplemented by, in each case, one database which is located in the nonvolatile memory of the mobile phone, each database being assigned to precisely one specific telephone directory. The uniquely defined assignment is made via a key.

Each database entry here is preferably indexed via a telephone number and has what is referred to as an attribute data field which is composed of a list of attribute designator/attribute value pairs, an attribute designator specifying the nature of the attribute value (for example, address), and an attribute value representing the value of the attribute; for example, the address associated with the telephone number. The attribute value can remain empty if the existence of the attribute is sufficient as information (for example, car pool). If there is only one, it does not need to be specified in more detail with a value.

When an entry in a telephone directory is accessed, a test is first automatically carried out to determine whether there is a database for this telephone directory. If this is the case, the additional information present in the database relating to the telephone number of the above entry can be made accessible as a key. The database which is assigned to a telephone directory is preferably in the form of an expansion telephone directory. A number of expansion telephone directories also can be assigned to each telephone directory.

The advantages of the present invention result from the number of possible attributes. Conceivable additional attributes for telephone numbers are:

Fax-compatible, SMS-compatible, voice-compatible, email-compatible:
Telephone numbers which are characterized with this attribute permit the selection of a corresponding service when text messages are transmitted.

Personal, business, etc.:
Telephone numbers which are characterized with this attribute can be assigned to specific groups, for example, to the group of private telephone numbers or to that of business telephone numbers. Access to the telephone directory thus can be made easier in that the user first specifies the group in which he/she would like to search and then subsequently searches, for example, alphabetically for the desired subscriber within the selected group.

Supervisory board, management group, etc.

These attributes can designate groups to which the user would like to send text messages, fax messages or voice messages. The selection of the transmission method could be carried out automatically in conjunction with the compatibility attribute In addition, the mobile phone could automatically switch conference circuits with the respective group members via these attributes.

Address, etc.

In the case of these attributes, in contrast to the previous ones, an attribute value, namely the address associated with the telephone number, is associated with the attribute "address". This address could be used as additional information by the user or be integrated into the fax header when a fax message is sent.

Language:

The value of the attribute language indicates, for example, which language the fax header should be in.

Alternative call number:

The value of this attribute determines an alternative call number which is selected automatically if the primary number is, for example, occupied or cannot be reached.

Ringing tone:

The attribute value defines the ringing tone, in order, for example, to distinguish acoustically between a call from the characterized number and other numbers via the pitch or the sound.

Response method:

The attribute value indicates whether or not a call is to be automatically accepted from the assigned telephone number. A possible method would be to accept the call in order then to play a specific short text (voice message), or that the mobile phone stores the calling telephone number and informs the mobile phone owner of the attempt to make a call or possibly of the content, by email or by fax.

Additional features and advantages of the present invention are described in, and will be apparent from, the following detailed Description of the Invention and the Figures.

BRIEF DESCRIPTION OF THE FIGURES

FIG. 1 shows a schematic view of the inventive expansions of the telephone directory of a mobile phone.

DETAILED DESCRIPTION OF THE INVENTION

Figure 2:
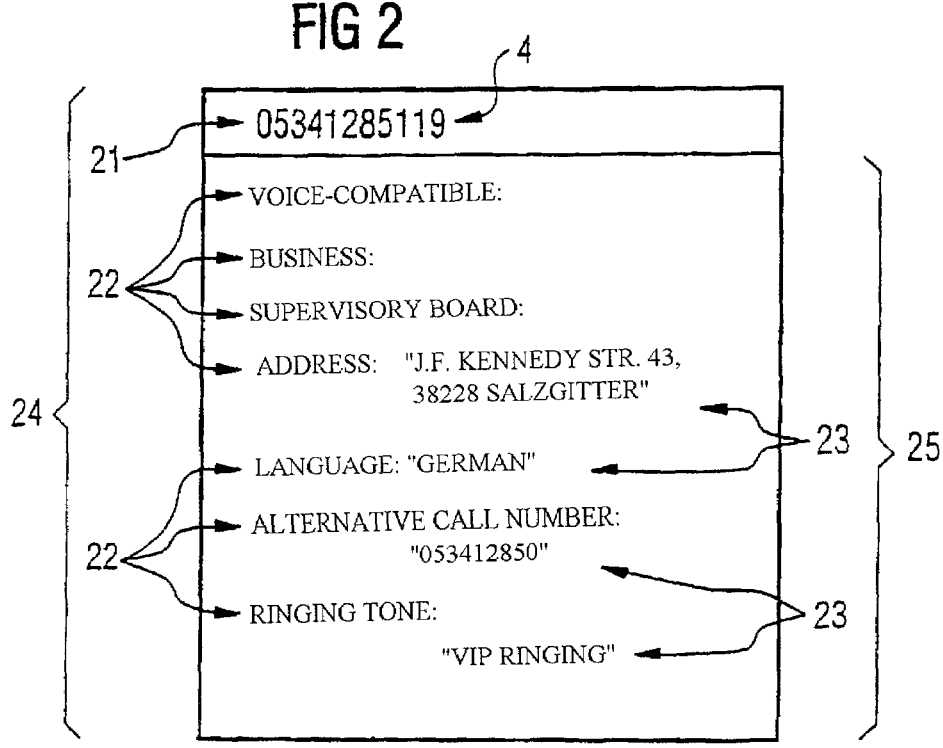
FIG. 2 shows an example of an attribute in the expanded telephone directory according to the present invention.

There are two implementation proposals for the invention.

FIG. 1 shows a mobile phone 1 with its accessories. It includes inter alia, an SIM card 2, 3 and a nonvolatile internal memory 10. Part 11 of the nonvolatile memory 10 is used for storing one or more telephone directories 13, 14.

An SIM card 2 is inserted into the mobile phone 1 in a schematic view. The other view of the same SIM card 3 serves for explanatory purposes. On such an SIM card 2, 3 there is a nonvolatile memory 8, part 9 of which is used as a telephone directory 15. In addition, the SIM card 2, 3 contains what is referred to as the IMSI (International Mobile Subscriber Identity) 7 for identification purposes.

In addition, an entry 6 of a telephone directory 15 of an SIM card 2, 3 is illustrated in the lower part of FIG. 1. Such an entry 6 contains the telephone number 4 and the name 5 of the subscriber; i.e., two attributes.

The first implementation assigns a second expansion telephone directory 17, 18, 19 to each standard telephone directory 13, 14 and/or 15 which has the standard storage entries 6 composed of the telephone number 4 and name 5, stored in the nonvolatile memory unit 9 of the memory 8 of the SIM card 2, 3 or in the nonvolatile memory unit 11 of the memory 10 of the mobile phone 1. The expansion telephone directory 17, 18, 19 is arranged in a further memory unit 16 of the nonvolatile memory 10. The assignment is made by reference to a uniquely allocated identification number 12. The identification number 1, which appears in the expansion telephone directory 17 as E1, is represented for the telephone directory 13 in FIG. 1. A 2 is schematically represented for the telephone directory 14, to which the expansion telephone directory 18 is assigned with the identification number E2. In an analogous fashion, a telephone directory with the IMSI 0542876 is correspondingly assigned to the expansion telephone directory 19 with the number E0542876; i.e., the telephone directory 15 is assigned to the illustrated SIM card 3.

In addition, further expansion telephone directories 20, which relate to SIM card telephone directories of SIM cards (not illustrated) other than those which are currently in use can be located in the region 16 of the nonvolatile memory 10.

FIG. 2 then illustrates the entries 24 of an expansion telephone directory 17, 18, 19, 20. Such expanded entries 24 of an expansion telephone directory are composed of the telephone number 21 and a data field 25 of a variable size.

The attributes which are assigned to the telephone number 21 and are composed of an attribute designator 22 and an attribute value 23 are in this data field 25, it being possible for the attribute value 23 to be empty at specific attribute designators 22. For example, the attribute designators "voice-compatible", "business" or "supervisory board" do not have to contain an attribute value, but they can.

The attribute value specifies the nature of the attribute designator. This is apparent from the examples illustrated. For example, the attribute designator "address" is specified by the value; i.e., the actual address. For the attribute designator "language", "German" specifies the value. The same applies to "alternative call number" and "ringing tone".

The attribute values are represented syntactically in inverted commas and separated off from the preceding attribute designator by a colon. The attribute value can be omitted if the existence of the attribute designator is sufficient as information.

During the reading process, the entry in the standard telephone directory is linked to the entry in the expansion telephone directory by reference to the telephone number, and is available as an expanded telephone directory entry 24.

During storage, the entire telephone directory entry which is made available by a corresponding application is split into a standard telephone directory entry 6, i.e., telephone number and name, and into an expanded telephone directory entry 24, i.e., telephone number and attributes (which are empty under certain circumstances). The entries are stored separately. The storage of an expanded entry 24 can be dispensed with if the attributes are empty. In this case, it would, however, be necessary to check whether there is an entry in the expanded telephone directory 17, 18, 19, 20. This would then have to be erased. Otherwise, a superfluous link would be produced.

During searching, operations are carried out sequentially. Depending on the search criterion, the standard telephone directory is firstly searched through for the telephone number or name, or the expansion telephone directory searched through for specific attributes. The entries which are found are completed to form expanded telephone directory entries.

The deletion of entries is carried out by reference to the telephone number, both the entry in the telephone directory and the entry in the expanded telephone directory being erased.

Figure 3:
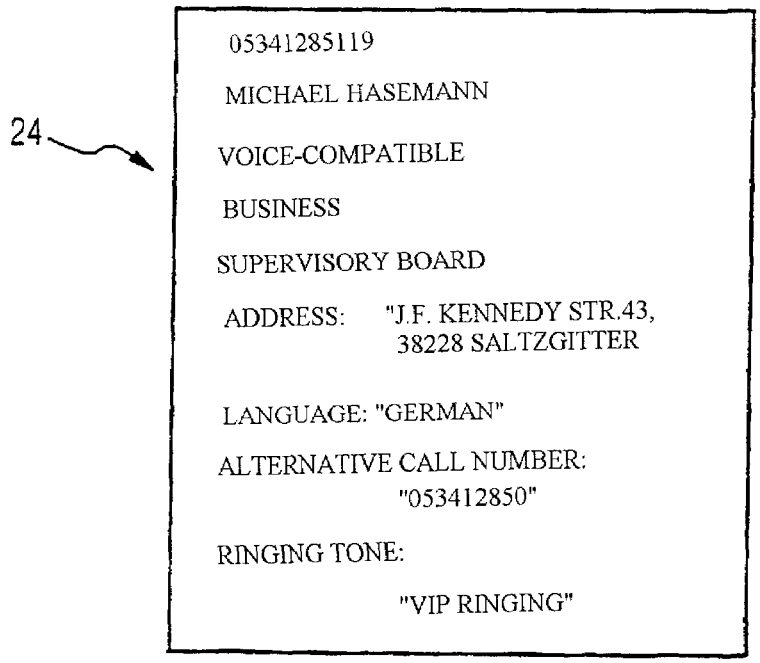
FIG. 3 shows a completed, expanded entry.

In the second implementation as illustrated in FIG. 3, telephone directories which are stored in the nonvolatile internal memory 10 of the mobile phone 1 differ in format from those external telephone directories which are stored on the SIM card 2, 3. Here, the entries in the internal telephone directories correspond in format to the expanded telephone directory 24 described above in the first implementation, the internal telephone directory now containing not only the telephone number 4, 21 but also the name 5.

For each external telephone directory 15, therefore, there is an internal telephone directory 19 which is, in turn, uniquely assigned to the external telephone directory by the IMSI (International Mobile Subscriber Identity) 7. Reading and writing access operations to telephone directories to which an external telephone directory is assigned are permitted only if the SIM card 2, 3 is inserted.

Apart from the internal telephone directories which are assigned to the external telephone directories stored on SIM cards, there also can be further internal telephone directories.

Whenever the telephone is switched on or an SIM card is inserted, the entries in the SIM card telephone directory are compared with the entries in the assigned internal telephone directory. Entries which are present in the external telephone directory but not in the internal one are copied. Because there are no attributes in entries of external telephone directories because the format does not permit any for entries in SIM card telephone directories, this data field remains empty in the entries in the assigned internal telephone directory. Entries which are present in the internal assigned telephone directory, but not in the external one, are erased in the internal one. In the case of entries which are present in both telephone directories but are different, the entry in the internal, assigned telephone directory is overwritten by the entry in the external telephone directory.

Reading access operations to telephone directories are made only to the internal telephone directories. In the case of reading access operations which relate to the SIM card telephone directory, the internal assigned telephone directory is resorted to.

In the case of writing access operations, entries which are reduced to the telephone number and name are written to the SIM card telephone directory, and complete expanded entries are stored in the internal telephone directory.

Although the present invention has been described with reference to specific embodiments, those of skill in the art will recognize that changes may be made thereto without departing from the spirit and scope of the invention as set forth in the hereafter appended claims.

The invention claimed is:

1. A mobile phone, comprising:
   a nonvolatile memory;
   an SIM card;
   at least one electronic telephone directory, one of the at least one of the electronic telephone directory being stored in a memory of the SIM card and another of the at least one electronic telephone directory, if applicable, being stored in the non volatile memory, a number of attributes including telephone numbers and names of the at least one telephone directory being prescribed by the SIM card; and
   at least one database stored in the nonvolatile memory and, each of the at least one database being respectively assigned to precisely one of the at least one electronic telephone directory;
   wherein each entry of a telephone directory is assigned to a corresponding database entry having a data field of variable size with respect to a number of additional attributes assigned to the telephone directory entry;
   wherein the data field of a database entry contains the additional attributes of the telephone number of the corresponding telephone directory; and
   wherein when an entry in a particular telephone directory is accessed, the mobile phone automatically performs a test to determine whether a database corresponding to the particular telephone directory is stored in the nonvolatile memory.

2. A mobile phone as claimed in claim 1, wherein each telephone directory is assigned precisely one database.

3. A mobile phone as claimed in claim 1, wherein each database has a key associated with the respective assignment between the database and the associated telephone directory.

4. A mobile phone as claimed in claim 1, wherein each of the database entries includes a characteristic diagram which points to the corresponding telephone directory entry in the corresponding telephone directory.

5. A mobile phone as claimed in claim 4, wherein the characteristic diagram of the database entry contains the corresponding telephone number.

6. A mobile phone as claimed in claim 1, wherein the at least one database is an expansion telephone directory.

7. A mobile phone as claimed in claim 6, wherein the expansion telephone directory stored in the nonvolatile memory differs in format from the electronic telephone directory stored on the SIM card, there being an internally assigned expansion telephone directory for each electronic telephone directory, and the expansion telephone directory being assigned by an IMSI to the electronic telephone directory.

* * * * *